(12) United States Patent
Barvesten

(10) Patent No.: US 6,311,057 B1
(45) Date of Patent: Oct. 30, 2001

(54) METHOD OF CALLING A MOBILE STATION IN A MOBILE TELEPHONE SYSTEM

(75) Inventor: Mats Barvesten, Lars (SE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 08/883,004

(22) Filed: Jun. 26, 1997

(30) Foreign Application Priority Data

Jun. 27, 1996 (SE) .................................................. 9602539

(51) Int. Cl.⁷ ...................................................... H04M 3/42
(52) U.S. Cl. .......................... 455/415; 455/412; 455/413; 455/414; 455/517
(58) Field of Search ..................................... 455/412, 413, 455/435, 558, 564, 566, 414, 415, 417, 528, 517, 459; 340/311.1

(56) References Cited

U.S. PATENT DOCUMENTS

| | | |
|---|---|---|
| 5,239,577 | 8/1993 | Bates et al. . |
| 5,506,888 * | 4/1996 | Hayes et al. ............................. 379/59 |
| 5,511,111 * | 4/1996 | Serbetcioglu et al. ................. 379/67 |
| 5,579,372 * | 11/1996 | Astrom .................................... 379/58 |
| 5,657,373 * | 8/1997 | Hermansson et al. ............... 455/435 |
| 5,740,540 * | 4/1998 | Emmermann ........................ 455/458 |
| 5,758,279 * | 5/1998 | Foti ....................................... 455/412 |
| 5,818,810 * | 10/1998 | Gallant et al. ........................ 455/433 |
| 5,924,044 * | 7/1999 | Vannatta et al. ..................... 455/556 |
| 5,930,700 * | 7/1999 | Pepper et al. ........................ 455/414 |
| 6,192,218 * | 2/2001 | Laufmann et al. .................... 455/415 |

FOREIGN PATENT DOCUMENTS

| | | |
|---|---|---|
| 2133859 | 7/1995 | (CA) . |
| 699 009 | 8/1994 | (EP) . |
| 0 699 009A1 | 2/1996 | (EP) . |
| 94/29992 | 12/1994 | (WO) . |

OTHER PUBLICATIONS

ETSI Technical Standard GSM 03.40, "Digital cellular telecommunications system (Phase 2); Technical realization of the Short Message Service (SMS) Point–to–Point (PP)" Draft pr ETS 300 536 (May 1996).

ETSI Technical Standard GSM 03.41, "European digital cellular telecommunications system (Phase 2); Technical realization of Short Message Service Cell Broadcast (SMSCB)" Draft pr ETS 300 537 (Dec. 1995).

* cited by examiner

*Primary Examiner*—William Trost
*Assistant Examiner*—Congvan Tran
(74) *Attorney, Agent, or Firm*—Burns, Doane, Swecker & Mathis, L.L.P.

(57) ABSTRACT

When a mobile station in a mobile telephone system is called, a check is made whether the mobile station is operatively available for answering an incoming call to the mobile station. If the mobile station is found to be unavailable for answering the call, the telephone number of the caller is registered. Name information relating to the caller is retrieved from the operator, which provides the caller's telephone subscription. A digital text message is provided with identity information, comprising the registered telephone number and the corresponding name information, and is transmitted to the mobile station, once the mobile station becomes operatively available.

11 Claims, 3 Drawing Sheets

METHOD OF CALLING A MOBILE STATION IN A MOBILE TELEPHONE SYSTEM

TECHNICAL FIELD

The present invention relates to a method of calling mobile station in a mobile telephone system, wherein the telephone number (A-number, CLI=Caller Line Identity) of the caller is registered, if the mobile station to which the call is directed is operatively unavailable for answering the call, and wherein the registered telephone number is transmitted at a later time to the mobile station, when the mobile station is operatively available.

BACKGROUND

Mobile or cellular telephony is when an operator—such as a public department or a commercial company—provides a plurality of geographically distributed radio base stations. Each radio base station is arranged to cover a certain area or cell, and the different cells are chosen in a way that they together will cover a continuous geographic area. The radio base stations are connected via base station controllers to a switching center for mobile tele-phony, which in turn is connected to the public switched telephone network, wherein incoming and outgoing calls may be switched to and from the mobile stations present in the area, for instance radio telephones or cellular telephones. A known standard for digital cellular mobile telephony is GSM (Global System for Mobile Service), which today covers a large part of the world. In the following GSM will be used as a basis for examples and discussion, but the description below may in all essential parts be applied also to other standards for mobile tele-phony, such as for instance D-AMPS (Digital Advanced Mobile Phone System) or PDC (Pacific or Personal Digital Cellular).

When a mobile station is switched on by a user, the mobile station will search for available radio base stations and then select the particular station, which appears to have the strongest signal strength. Then the mobile station will report its presence to the selected radio base station, which will forward the information to a switching center for mobile telephony. The mobile station will then be ready to serve incoming as well as outgoing telephone calls. If the mobile station is moved a considerable distance during an ongoing call (for instance when travelling in a car), the communication will automatically be switched to another radio base station (so called hand-over). Additionally, a feature known as roaming is available (the system will detect and keep track of subscribers, which are temporarily located abroad, so that the subscriber may continue to use his mobile station also under such circumstances). Hence, a modern mobile telephone system such as GSM is able to offer the users a high-quality and highly automatized service.

The procedure above is only possible on condition that the mobile station is in operative connection with the rest of the mobile telephone system, i.e. the mobile station is in contact with a radio base station and is thus available for telephone service. Opposite situations are for instance when: a) the user has turned off the mobile station, b) the supply of power to the mobile station is insufficient (the battery has "run out"), or c) the mobile station is without reach from the radio base station—for instance in road tunnels, in subterranean locations or otherwise out of reach. For every call which does not reach the intended subscriber, the load on the mobile telephone system is increased, since the resources thereof (such as the available frequencies or channels) are unnecessarily occupied.

In order to increase the service also in such situations, where a subscriber may not be reached through his mobile station for the moment, the telephone operators offer a variety of services. One example is call-forwarding, where the subscriber may enter an alternative telephone number, to which incoming calls are to be directed, should the subscriber not be reachable on the ordinary telephone number. A further example is voice-mail services, where the caller may leave a spoken message in a voicemail box at the telephone operator and where the subscriber at a later stage may call the telephone operator in order to listen to any messages available.

A drawback of this latter service is the fact that the subscriber must himself remember to check his voicemail box at a regular basis. As an aid many operators now provide an automatic message service through so called SMS-messages (Short Messages Services), i.e. short text messages, which may be shown on the mobile station display. Once the subscriber's mobile station regains contact with the rest of the mobile telephone system, an SMS-message is sent to the mobile station with an indication that at least one spoken message is available for playback in the subscriber's voicemail box, on condition that someone actually has tried to reach the subscriber and indeed left a spoken message. The SMS-service is defined as part of the GSM standard in ETSI Technical Standards (ETS) 03.40-41. A corresponding service for American cellular telephony is defined in the EIA/TIA standard IS 136.

Despite the improvements above certain shortcomings in the procedure above may still be identified. The caller (the so called A-subscriber) must take the time to leave a spoken message to be deposited in the voicemail box of the receiving party (the B-subscriber). When the B-subscriber is reached by an SMS-message indicating that a spoken message is available, the B-subscriber must i) call his/her voicemail box, ii) take the time to listen through the message (s), and iii) in most cases locate the telephone number of the A-subscriber in question before calling back to the A-subscriber.

In EP-B-0 699 009 a mobile telephone system is illustrated, wherein the telephone number (A-ID) of the caller (A-subscriber) is automatically registered in situations, where the intended receiver of the call (B-subscriber) may not be reached for the moment. The registered telephone number (A-ID) is then generated as a text message (for instance SMS) and stored in a message central. Once the B-subscriber becomes operatively available again, the stored text message is transmitted to the mobile station of the B-subscriber, wherein the telephone number of the A-subscriber is shown on the display in the B-subscriber's mobile station. Subsequently the B-subscriber may dial the telephone number shown on the display, if desired.

The system described above has eliminated some of the shortcomings above. However, the proposed solution is not perfect, neither when it comes to user-friendliness nor with regard to the available bandwidth. In many cases a telephone number alone, i.e. a sequence of some ten digits, is insufficient for enabling the user (B-subscriber) to identify the person, which has tried to reach him/her (i.e., the A-subscriber). As a consequence the B-subscriber has to a) either find out the identity behind the A-number by for instance calling a number information service provided by the operator, or b) dial the registered A-number without a priori knowledge of the identity thereof, i.e. without being given an opportunity to prepare himself/herself and without really knowing the importance of the previous call.

SUMMARY

The object of the present invention is to provide improved service to telephone subscribers when a mobile station is operatively unavailable for answering an incoming call, where the party to which the call was directed is given clear and unambiguous information regarding the origin of the previous unsuccessful call and where the number of bandwidth-consuming and unnecessary telephone calls is minimized.

The object of the invention is achieved by a method of calling a mobile station in a mobile telephone system wherein a telephone number of the caller is registered, if the mobile station is found to be operatively unavailable for answering the call, and wherein the telephone number thus registered is transmitted to the mobile station at a later moment, when the mobile station has regained its operative availability, comprising the steps of analyzing the registered telephone number so as to identify a particular operator from which the call originates, retrieving name information from the identified operator relating to the name of the subscriber, to which the registered telephone number belongs, and generating a digital text message, comprising the registered telephone number and the corresponding retrieved name information for transmission to the mobile station when the mobile station becomes operatively available.

BRIEF DESCRIPTION OF THE DRAWINGS

The invention will now be described in more detail, reference being made to the accompanying drawings, in which.

DETAILED DISCLOSURE

Figure 1:
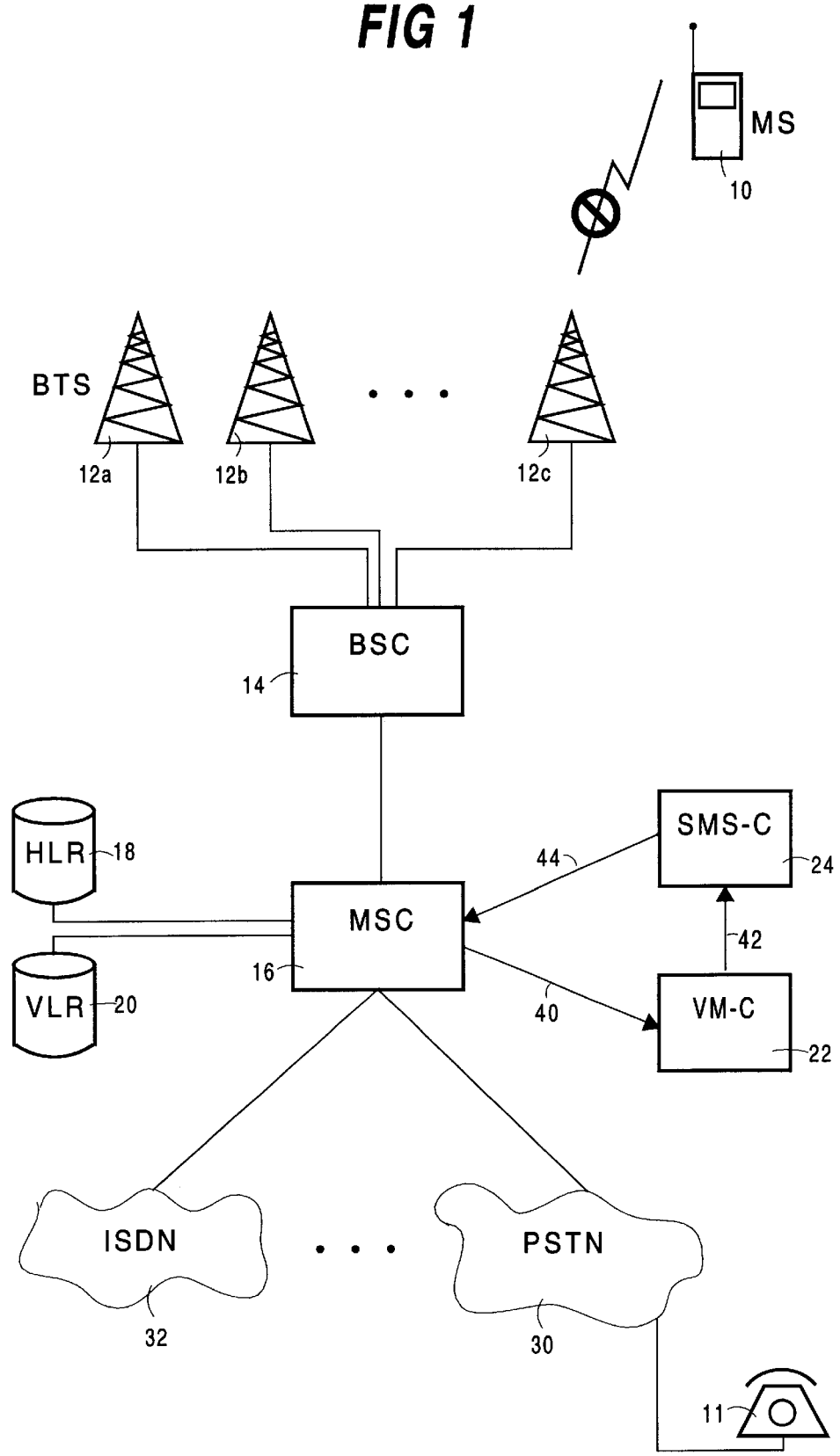
FIGS. 1 and 2 are schematic block diagrams for a mobile telecommunications system, in which the method according to the present invention may be used.

FIG. 1 illustrates a mobile telecommunications system. The illustrated block diagram is an example of a GSM-system developed by the applicant, and the invention will be described below with reference to this system. However, it is to be understood that the invention may of course be applied also to other systems for mobile telecommunications not specifically disclosed herein. In the drawing a portable GSM-phone 10 is illustrated, which hereinafter will be referred to as a mobile station (MS). A plurality of radio base stations 12a, 12b, 12c (BTS, "Base Trans-ceiver Station") are arranged for covering one cell each for conveying incoming and outgoing calls to/from mobile stations 10 present in the respective cells by means of radio waves. The radio base stations 12a–c are connected to a base station controller 14 (BSC), which in turn is connected to a switching center 16 (MSC, "Mobile Services Switching Center"). The mobile services switching center is fundamental to the system and is responsible for carrying out the various switching operations of mobile telephony. The center is connected to other telephone networks, such as the public switched telephone network 30 (PSTN) as well as the digital telephone network 32 (ISDN, "Integrated Services Digital Network"). With the arrangement above a subscriber connected to any of these wired telephone networks may establish contact with a mobile telephone subscriber. For instance, the subscriber connected to the public switched telephone network 30 may call the mobile station 10 through a stationary station 11 (such as an ordinary analog telephone device).

For fulfilling its switching tasks the mobile services switching center 16 is operatively connected to a home database 18 (HLR, "Home Location Register") and a visitor database 20 (VLR, "Visitor Location Register"). The home database 18 stores information about a plurality of subscribers, all of which are subscribers to mobile telephone services provided by the operator, who is in charge of the mobile communications portions in FIG. 1. Preferably, the home database may provide service to several mobile switching centers, one of them being the center 16. The visitor database 20 stores information about all "foreign" subscribers, which are temporarily located within the service area of the mobile switching center 16.

When a caller or A-subscriber wants to use the stationary station 11 for calling a B-subscriber via the mobile station 10, the following occurs. The call is switched by the public telephone network 30 to the mobile switching center 16, which determines that the mobile station 10 is presumably located within the service area of the mobile switching center 16 by accessing the home database 18 and the visitor database 20. The mobile station 10 is called through the base station controller 14 and one of the radio base stations 12a–c. If the mobile station is operatively available, i.e. the phone is switched on and is within reach of the closest radio base station 12a–c, a hand-shaking procedure is executed between the mobile station and the radio base station, wherein the call is established. The mobile station 10 may be transferred between the service areas of different radio base stations without losing contact with the subscriber, thanks to the automatic hand-over procedure described above.

Should the intended B-subscriber be operatively unavailable, for instance due to the mobile station 10 being switched off or being located without reach of a radio link, the situation has been dealt with in the following way in some previously known systems. When the base station controller 14 notices that a certain amount of time has elapsed without any successful establishment of contact between the mobile station 10 and one of the radio base stations 12a–c, the base station controller 14 will report this fact to the mobile switching center 16, which in turn will redirect the call to a voicemail central 22 (VM-C). This redirection is indicated by an arrow 40 in FIG. 1. The voicemail central 22 accepts, in a way described above, a spoken message from the A-subscriber to the intended B-subscriber, if so is desired. On condition that the A-subscriber chooses to leave a spoken message, the voice-mail central 22 will report this to an SMS-central 24, as is illustrated by an arrow 42. The SMS-central 24 will register this information together with for instance the time, at which the message was left.

Once the mobile station 10 return to be operatively available to the mobile telephone system, and the presence thereof is detected by any of the radio base stations 12a–c and is reported to the mobile switching center 16, the mobile switching center 16 checks whether an SMS-message addressed to the subscriber of the mobile station 10 is stored in the SMS-central 24. Considering the exemplary situation above, the SMS-central 24 will indeed contain a message to said subscriber, the SMS-central 24 therefore transmitting the message to the mobile switching center 16 according to the arrow 44, and said mobile switching center 16 forwarding the SMS-message through the base station controller 14 and the radio base stations 12a–c to the mobile station 10. The subscriber may then use the mobile station to call the SMS-central 24 and listen to the spoken message.

Note that the subscriber of the mobile station 10 is only informed of an unsuccessfully attempted call from the A-subscriber, if the following conditions are fulfilled:

The A-subscriber has taken the time to listen through the "greetings message" of the SMS-central The A-subscriber has then left a certain message for the intended B-subscriber After having received the SMS-message the B-subscriber has taken the time to call the SMS-central 24 and listen to the spoken message stored in his/her voicemail box.

Figure 2:
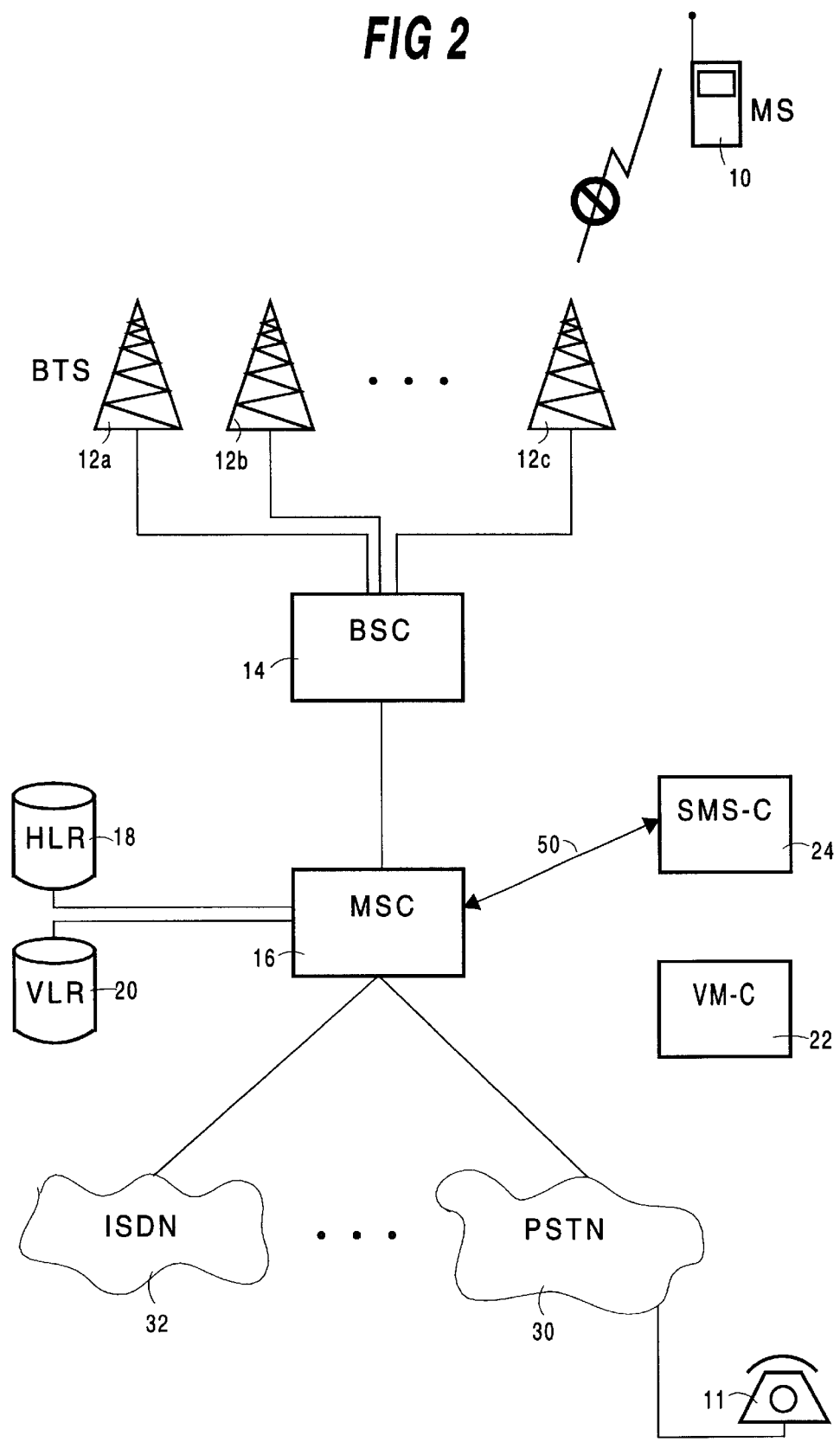
Figure 3:
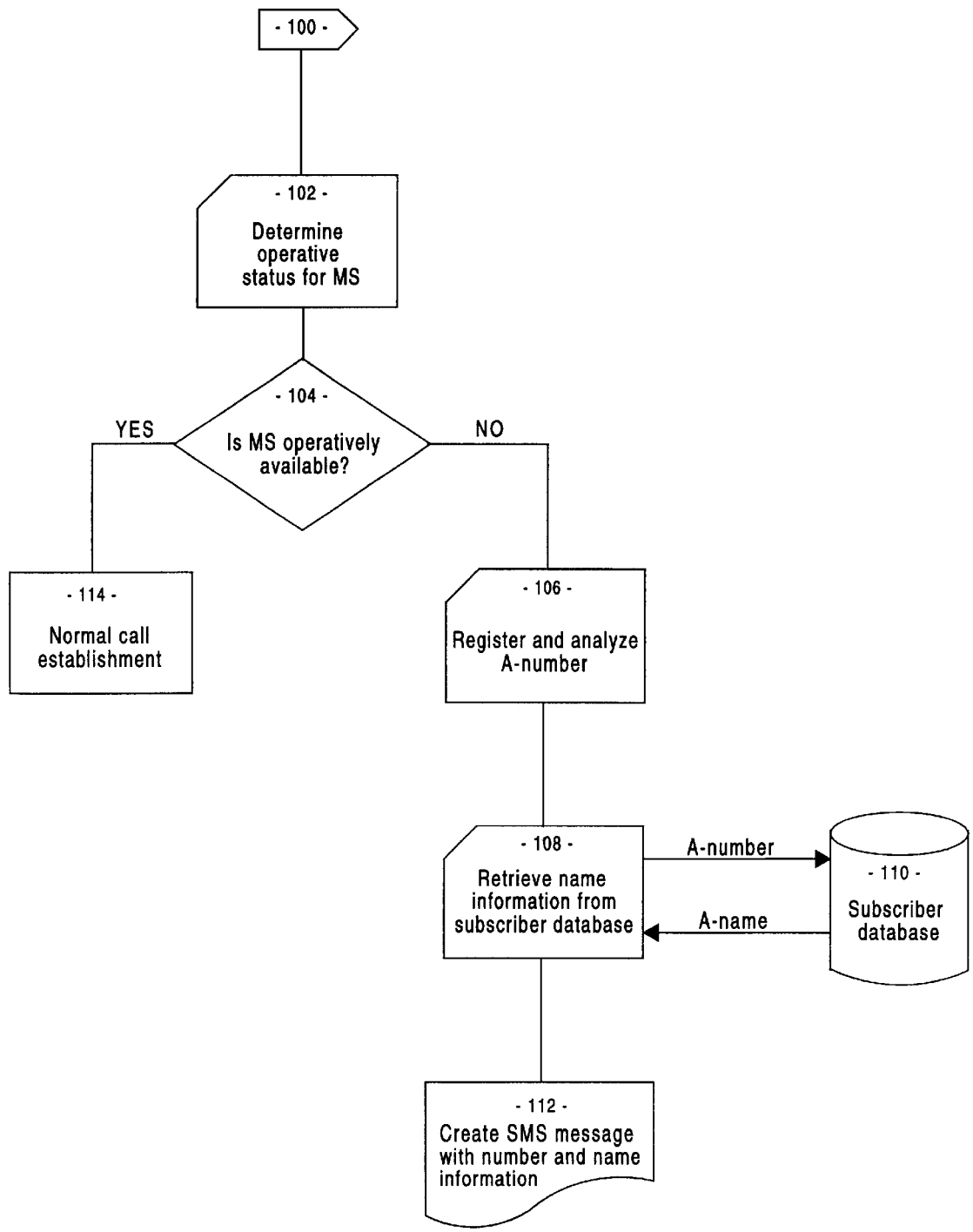
FIG. 3 is a flow diagram for illustrating the method according to a preferred mode of the present invention.

According to the invention the following procedure is proposed, which will be described with reference to FIGS. 2 and 3. The mobile telecommunications system disclosed in FIG. 2 is identical to the one of FIG. 1, apart from what is mentioned below. The mobile station 10, the stationary station 11, the radio base stations 12a–c, the base station controller 14, the home database 18, the visitor database 20, the public switched telephone network 30 and the digital telephone network 32 are all identical to the ones in FIG. 1 and are consequently not described in more detail now. However, the following functions have been added to the mobile telephone system.

When an attempted call is made to a mobile station 10 located in the system, a check is made whether the mobile station is operatively available for telecommunication with the caller (A-subscriber) via a radio link. If this is the case, a normal call is established between the A-subscriber (here, the stationary station 11) and the B-subscriber (here, the mobile station 10).

However, if the mobile station 10 is not ready to serve an incoming call (for instance because the mobile station has been turned off, the battery is empty, or the mobile station is in some way out of reach of the rest of the system), the system will automatically register the telephone number of the A-subscriber (A-number, CLI="Caller Line Identity"). The registered A-number is then analyzed so as to determine the particular operator, to which the A-subscriber is related. The mobile switching center 16 then establishes electronic contact with a subscriber database administered by the particular operator, which was found to be the provider of the A-subscriber's subscription. Using the registered A-number the mobile switching center 16 requests additional information regarding the subscriber related to that A-number from the operator, and in return the mobile switching center 16 receives information regarding the name of the subscriber. A text message is generated from the registered A-number and the corresponding name information received from the operator of the A-subscriber. When the mobile station 10 returns to a state of operative availability for communication with the rest of the system, the text message is transmitted to the mobile station 10, for instance as an SMS-message, as is indicated by an arrow 50 in FIG. 2. Several different A-subscribers may have attempted to call the mobile station 10 during its period of unavailability, and in such cases name and number information relating to all these subscribers are transmitted to the mobile station, once it becomes available. A basic form of the method according to the invention is realized as a computer software routine executed in the mobile switching center 16. Such a routine is illustrated by the flow diagram in FIG. 3.

The routine 100 is executed by the computer system of the mobile switching center, as soon as a request is made for establishing a telephone call to a mobile station 10 presumably located within the service area of the switching center. In a step 102 the operative status is determined for the mobile station, to which the call is intended, for instance by monitoring whether the mobile station 10 responds to the calling signals from one of the radio base stations 12a–c. In a subsequent step 104 a decision is made based upon the mobile station status determined in step 102. If the mobile station 10 is found to be operatively available, the call is established in a normal way in a step 114, which will not be described in more detail.

However, if the step 104 determines that the mobile station is operatively unavailable for receiving the incoming call, the execution is passed to a step 106, wherein the telephone number (A-number) of the caller is registered. The A-number thus registered is temporarily stored in a storage means in the mobile switching center 16. The A-number is analyzed so as to determine the origin of the call with regard to nationality and operator. This information is required by the subsequent step 108, wherein the operator of the A-subscriber will be contacted. Normally, the national origin of the call is indicated by a number prefix (country code) in the registered A-number. Subsequent digit positions usually indicate the particular operator (hereinafter referred to as A-operator) to which the A-subscriber is related. Note that the A-operator may be a) a traditional operator of public switched telephone network services, b) a provider of mobile telecommunications services, c) a provider of digital telecommunications services, etc. Obviously, the A-operator may be identical to the operator, to which the intended B-subscriber is related (B-operator).

On the basis of the information regarding the operator of the A-subscriber determined in step 106, the mobile switching center 16 establishes contact with a computer system 110 belonging to the A-operator in step 108. Using the registered A-number as input data, the mobile switching center 16 requests additional information regarding the A-subscriber from the A-operator. According to the preferred embodiment of the invention this information consists of the name of the A-subscriber (first names and surnames for private persons, company names for companies, etc).

The computer system belonging to the A-operator preferably executes a query program, by means of which the name information relating to the A-subscriber may be obtained by accessing a subscriber database and selecting a subscriber information record corresponding to the A-number. The name information contained in the subscriber information record is returned to the mobile switching center 16, as illustrated by the arrows in FIG. 3. In a step 112 the mobile switching center 16 calls the SMS-central 24 and requests the generation of an SMS-message for the mobile subscriber in question. The SMS-message comprises the registered A-number, the name information received from the A-operator, and preferably some additional information, such as date and time when the unsuccessful call was registered. Finally, the execution of the routine 100 ends, wherein the mobile switching center 16 returns to a normal mode of activity. As soon as the mobile station 10 is operatively available, it will be detected by the mobile switching center 16 (or some other mobile switching center, in case the mobile station 10 in the meantime has been transferred a long distance), wherein all message(s) stored in the SMS-central 24—in particular those messages which contain information about the unsuccessful call attempt(s) above—are transmitted to the mobile station 10. The telephone number and name of the person or persons, which during the operative unavailability of the mobile station attempted to call the user, are now automatically shown on the mobile station display, optionally together with a question regarding whether a return call is desired. By simply pressing an appropriate key the user may request a return call to be dialed to the number or numbers in question. Hence, according to the invention, the user (the B-subscriber, as described above) is provided access not only to a more or less anonymous telephone number, but also clarifying name information relating to the person that tried to reach the user, wherein the usefulness of the service is substantially improved.

Instead of generating one SMS-message for each unanswered call, the registered A-numbers and the corresponding name information may as an alternative be stored together in for instance the mobile switching center 16 to be transmitted in a single SMS-message to the mobile station 10, once the latter regains its operative availability.

Furthermore, the voicemail central 22 disclosed in FIG. 1 may be used to read out a message for the A-subscriber, before the A-number is registered. For instance a message like "Please press 1 for automatic registration of your telephone number, 2 to leave a message and 3 to exit" may be used. Such a procedure may have certain legal advantages, while maintaining the personal integrity at the same time, since the caller is given the opportunity to avoid registration of A-number and corresponding name information.

As an alternative, the method according to the present invention may be used as an indirect paging device for persons with no access to a mobile telephone of their own. Such situations may exist in less developed countries, where the purchase and possession of a private mobile telephone is financially impossible for a majority of the population. A low-cost telephoneless subscription provided by a telephone operator would be satisfactory to many such people. Each subscriber would be provided with a "Smart Card" type electronic card, containing subscriber information, and a telephone number assigned to the card. By inserting the card in card readers, which are made available at various public locations, the subscriber may regularly check for spoken messages addressed to him or her.

The description above of the invention is only to be regarded as embodiment examples. The method according to the invention may be applied in ways different to the ones described above within the scope of the invention, as defined in the appended patent claims.

What is claimed is:

1. A method of calling a mobile station in a mobile telephone system, wherein a telephone number of the caller is registered, if the mobile station is found to be operatively unavailable for answering the call, and wherein the telephone number thus registered is transmitted to the mobile station at a later moment, when the mobile station has regained its operative availability, comprising the steps of analyzing the registered telephone number so as to identify a particular operator from which the call originates, retrieving name information from the identified operator relating to the name of a subscriber, to which the registered telephone number belongs, and generating a digital text message, comprising the registered telephone number and the corresponding retrieved name information for transmission to the mobile station when the mobile station becomes operatively available.

2. A method according to claim 1, wherein the mobile station comprises a mobile telephone for use in a digital cellular mobile telephone system.

3. A method according to claim 1, wherein the mobile station comprises an electronic subscriber identification card and a card reader for reading the card.

4. A method according to claim 1, comprising the additional steps of showing the telephone number and name information contained in the text message received by the mobile station on a display in the mobile station together with a proposal for automatic dialing of the telephone number, and checking, through an input device in the mobile station, whether the dialling of the telephone number is requested, and—if so—performing the return call thus requested.

5. A method according to claim 1, comprising the intermediate steps of notifying the caller that the intended mobile station is operatively unavailable for answering the call by at least one of a spoken message, an acoustic message, and a visual message, and offering registration of identity information relating to the caller, wherein the identity information is only registered if the caller so permits by committing an acknowledging act.

6. The method of claim 1, wherein the operator is a provider of a subscription associated with the caller's telephone number.

7. The method of claim 6, wherein the caller does not leave a message.

8. The method of claim 6, wherein the caller's call is not answered.

9. The method of claim 1, wherein the mobile station is operatively unavailable because it is turned off.

10. The method of claim 1, wherein the mobile station is operatively unavailable because supply of power to the mobile station is insufficient.

11. The method of claim 1, wherein the mobile station is operatively unavailable because the mobile station is out of reach of the mobile telephone system.

* * * * *